ABSTRACT OF THE DISCLOSURE

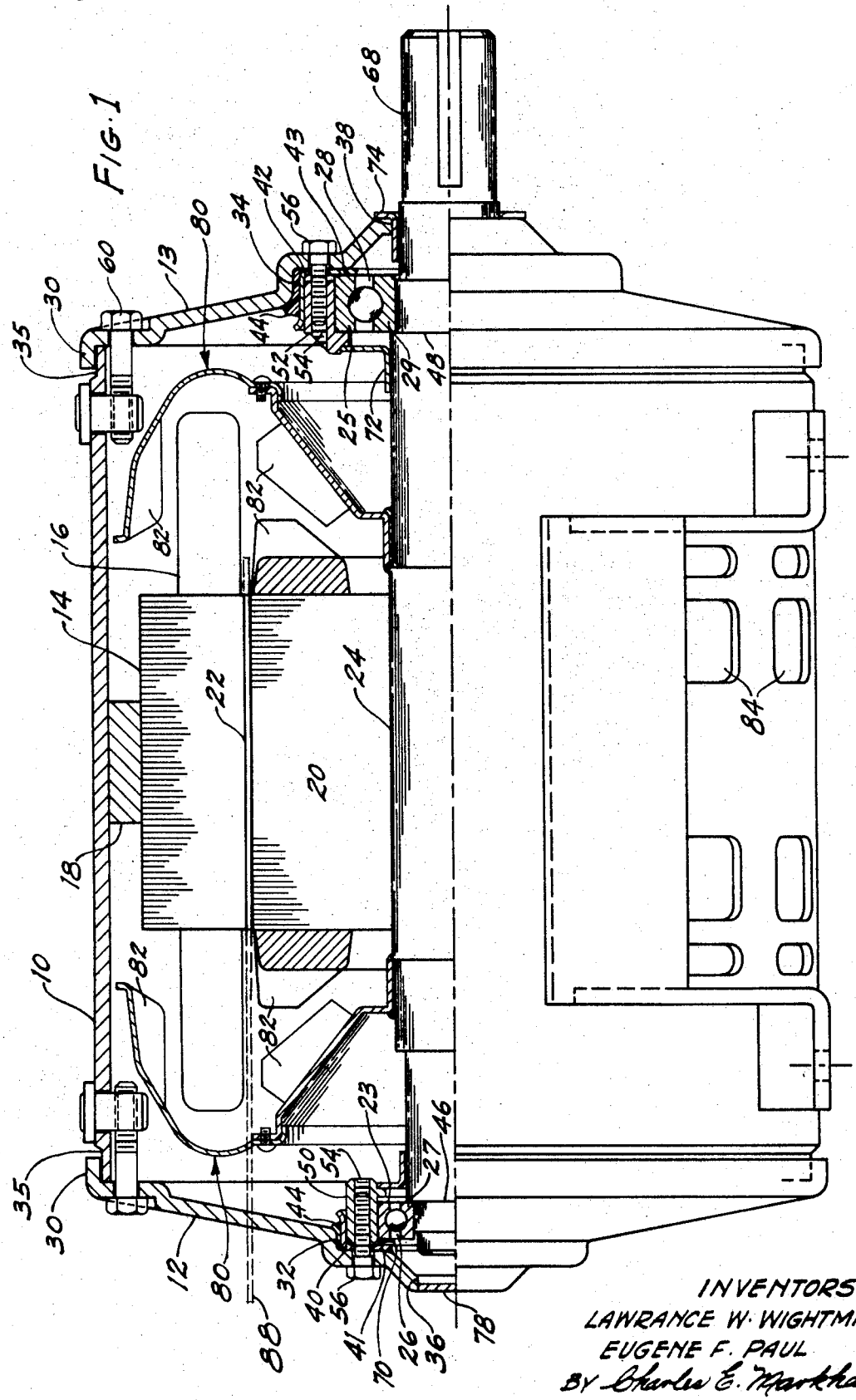

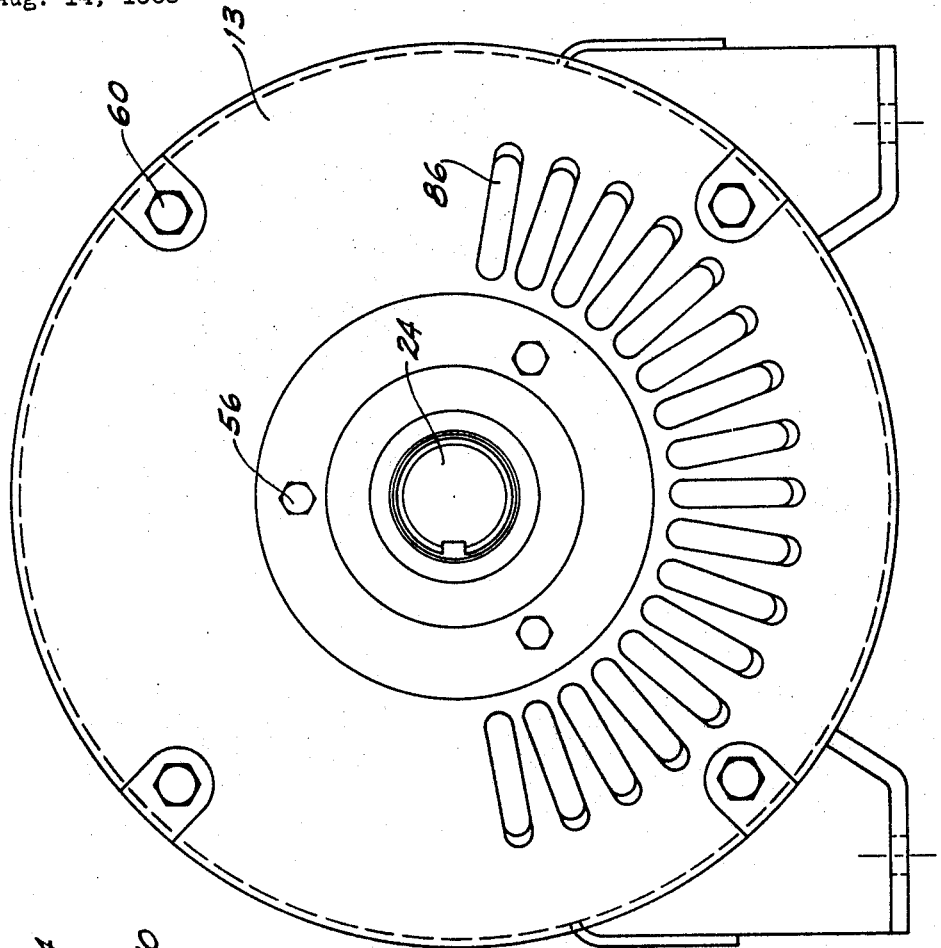
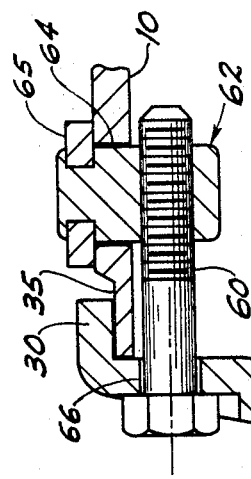
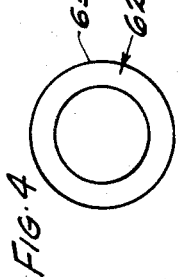
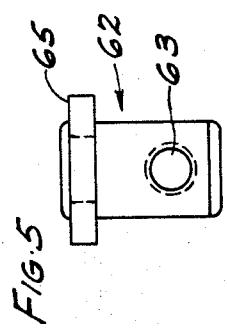
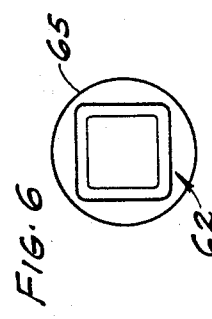
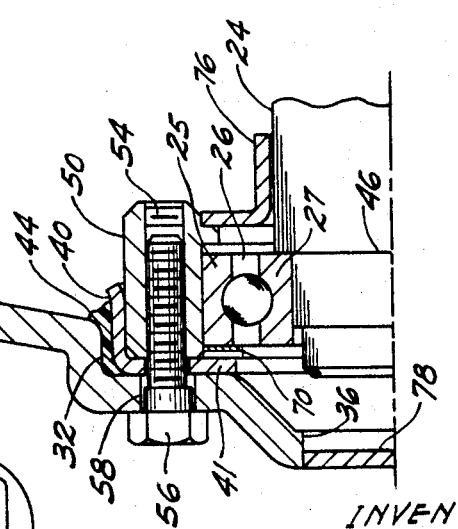
INVENTORS
LAWRANCE W. WIGHTMAN
EUGENE F. PAUL
BY Charles E. Markham
THEIR AGENT 3,518,471
ELECTRIC MOTOR WITH BALL BEARING AND
END SHIELD ARRANGEMENT
Lawrance W. Wightman, Creve Coeur, and Eugene F.
Paul, Overland, Mo., assignors to Emerson Electric
Co., St. Louis, Mo., a corporation of Missouri
Filed Aug. 14, 1968, Ser. No. 752,562
Int. Cl. H02k 5/16
U.S. Cl. 310—85
5 Claims

A "take apart," ball bearing, electric motor having detachable end shields in which the ball bearings are slip fitted into locating rings, which rings are in turn loosely fitted into and cemented to the end shields, the concentricity of the rotor in the stator and bearing alignment being established by shimming the air gap and accumulating tolerances in annular spaces between the loosely fitting locating rings and the end shields, which spaces are filled with an adhesive cementing material in soft form and subsequently hardens to fix the locating rings in the end shields.

---

This invention relates to dynamoelectric machines and particularly to "take apart," A.C., ball bearing, electric motors of relatively large size and to a construction thereof in which a high degree of concentricity of rotor and stator bore and alignment of bearings is achieved without the necessity of maintaining close and costly dimensional and alignment tolerances and in which this concentricity and alignment is retained upon subsequent "take apart" and reassembly of the motor.

The importance of a high degree of concentricity of the rotor in the stator bore and alignment of shaft bearings to efficient, smooth, and long-lived electric motor operation is well known and understood in this art. These requirements have been met with economy in the manufacture of smaller, permanently assembled, "throw-away" motors by permanently cementing loosely fitting elements. Usually this is accomplished by first shimming the rotor concentric in the stator bore with the bearings on the rotor shaft and then either cementing the bearings to permanently fixed supporting end shields or fixing the bearings in end shields loosely fitting the stator or casing and cementing the loosely fitting end shields to the stator or casing. In this construction the shims are withdrawn axially through apertures in the end shields after the cement has set.

It is not, however, economically sound to discard larger more costly motors when repairs can be made, so that a construction which utilizes the expedient of cementing loosely fitting joints to take up dimensional and alignment tolerances and yet permits convenient disassembly and reassembly without the loss of established motor concentricity and bearing alignment is highly desirable. In ball bearing motors it is essential to preclude any slipping or spinning of the inner bearing races on the rotor shaft which would result in fretting or erosion of the shaft, so that it is customary to press fit the inner ball bearing races on the shaft. This then, for convenience of disassembly, requires a construction which permits the ball bearings to remain on the shaft when the rotor is removed from the stator.

In the prior art U.S. Pat. No. 3,165,816, to P. W. Thompson et al., issued Jan. 19, 1965, shows, in FIG. 10, a ball bearing motor employing a cemented annular joint and arranged for disassembly of the rotor from the stator. However, in this arrangement, the outer races of ball bearings 131 are "fixedly mounted" in retainer cups 129, and the side walls of the cups are permanently cemented to end shields 124. This arrangement requires, therefore, that the inner bearing races be slip fitted on the rotor shaft 132 to permit disassembly and, moreover, requires the provision of thrust bearings 133 and 134 to limit axial movement.

An object of the present invention is to provide a construction particularly adapted to, although not limited to, relatively large ball bearing electric motors in which a high degree of concentricity and bearing alignment is established upon initial assembly and which permits convenient disassembly and reassembly while retaining the established concentricity and alignment.

A further object is to provide a "take apart," ball bearing motor having detachable bearing supporting end shields in which the inner races of the bearings are press fitted on the rotor shaft and the outer races or their bearing caps are slip fitted into locating rings which are, in turn, loosely fitted into the end shields and cemented therein concentric with and in alignment with the stator bore.

A further object is to provide an electric motor as in the foregoing paragraph in which the outer races of the ball bearings are fitted with bearing caps which in turn are slip fitted into the bearing locating rings and in which the outer race of at least one of the bearings is locked to the adjacent end shield by means of the detachable connection of its bearing cap thereto whereby axial movement of the rotor shaft is prevented.

Further objects and advantages will appear from the following description when read in connection with the accompanying drawings.

In the drawings:

FIG. 1 is a half sectionalized elevational view of an A.C. motor constructed in accordance with the present invention;

FIG. 2 is an end elevational view of the electric motor shown in FIG. 1;

FIG. 3 is an enlarged fragmentary sectional view of the left-hand end of the motor showing the bearing and attachment of the end shield to the stator shell in more detail; and FIGS. 4, 5 and 6 are top, elevational, and bottom plan views, respectively, of the end shield attaching nut.

Referring now to the drawings in more detail, the electric motor includes a casing consisting of a cylindrical shell 10 and detachable end shields 12 and 13. A stator comprising a laminated core 14 and windings 16 is provided with a mounting ring 18, which is press fitted on the periphery of the stator core 14 and is, in turn, press fitted into the cylindrical shell 10 thereby to rigidly attach the stator to the shell. The motor further includes a rotor 20 mounted for rotation in a bore 22 in the stator core 14. The rotor 20 is fixed on a shaft 24 which is journalled in ball bearings 26 and 28 supported in end shields 12 and 13.

The circular end shields 12 and 13 may be formed by stamping, forging, or casting and include axially extending rim portions 30, the internal surfaces of which are machined and nicely fit over peripheral machined surfaces 35 at the ends of cylindrical shell 10. End shields 12 and 13 are further provided with central circular internal recesses 32 and 34 and with central perforations 36 and 38, respectively. The internal recesses 32 and 34 receive loosely fitting bearing locating rings 40 and 42, respectively, and the annular spaces between the axial walls of the recesses and locating rings are filled with an adhesive cementing material 44 which is applied in soft form and hardens to rigidly fix the bearing locating rings to the end shields. The inner edges of locating rings 40 and 42 are flared to facilitate entry of the bearings and each is pivoted with radially inward extending portions 41 and 43, respectively, which lie against the bottoms of recesses 32 and 34.

The shaft 24 is provided with locating shoulders 46 and 48 near the left and right-hand ends thereof, and the inner races 27 and 29 of ball bearings 26 and 28, respectively, are press fitted on the shaft 24 with their inner faces against their shoulders and are therefore accurately positioned axially on the shaft. The outer races 23 and 25 are entered in close slip-fitted circular recesses in circular bearing caps 50 and 52, respectively, and the bearing caps 50 and 52 are in turn entered into locating rings 40 and 42 in close slip fit relationship. The circular bearing caps 50 and 52 are provided with circularly spaced screw threaded holes 54 and are detachably connected to end shields 12 and 13 by machine screws 56 which pass through circularly spaced clearance holes 58 in the bottoms of the end shield recesses 32 and 34.

The end shields 12 and 13, which as their peripheries closely fit over the machined surfaces 35 at the ends of the shell 10, are detachably connected at their peripheries to the shell 10 by machine screws 60 and removable nuts 62. The nuts 62 are rectangular, see FIG. 6, having screw-threaded holes 63 in the bodies thereof and circular heads 65 riveted to the bodies. The nuts 62 are entered into peripherally spaced rectangular clearance holes 64 in the shell 10. The machine screws 60 pass through peripherally spaced clearance holes 66 in the end shields 12 and 13.

In the illustrated embodiment of the invention, shaft 24 has an end portion 68 projecting from the right-hand end of the motor for connection thereto of a driving gear or pulley and the ball bearing 28 at this end, and its associated elements are made larger than the left-hand bearing 26 and its associated elements, thereby to withstand the greater forces imposed at that end of the motor by a connected load. Also, in the illustrated embodiment, the bottom of the recess of bearing cap 52 at the right-hand end of the motor is drawn up tight against the inner face of the outer race of ball bearing 28 by the machine screws 56, thereby locking the outer race against rotational movement and also locking the entire rotor against axial movement. To facilitate this depth of the recess in bearing cap 52 is made less than the thickness of the races of ball bearing 28, as shown in FIG. 1. On the other hand, the left-hand end of shaft 24 is permitted to move axially slightly, relative to the motor casing, to accommodate axial dimensional tolerances and unequal thermal expansion of the rotor and casing occurring under operating conditions. To facilitate this the recess in the bearing cap 50 is made deeper than the thickness of the races of ball bearing 26 so that the bearing cap 50 may be pulled tight against the end shield 12 by screws 56 and yet permit axial movement of the outer bearing race in the bearing cap recess. A wavy, circular, spring washer 70 biased between the outer face of the outer bearing race 25 of ball bearing 26 and the radially inward extending portion 41 of locating ring 40 applies a yielding axial force to take up radial play in both ball bearings, see FIG. 3.

It will be understood that in some constructions, due to use conditions, the ball bearings and their associated elements may be of the same size at both ends of the shaft, and under other conditions of use, the bearing caps may be dispensed with and the outer race of the bearings entered directly into the locating rings in neat slip fit relationship with a biasing spring between the outer race of one of the bearings and the adjacent end shield.

The motor is further provided with lubrications sealing rings 72 and 74 at the right-hand end and 76 at the left-hand end. The central aperture 36 in the end shield at the left-hand end is closed with a pressed-in disc 78. Suitable air circulating means connected to the rotor is generally indicated at 80, including a plurality of axially and radially spaced blades 82 positioned so as to obtain a maximum air movement over the windings without objectional noise, and vents 84 and 86 are provided in the shell 10 and end shields to permit interchange of interal and ambient air.

In assembling the motor with the bearings press fitted on the shaft, with the bearing caps slip fitted on the bearings, and with the locating rings slip fitted on the bearing caps, the rotor is entered into the stator bore and cencentrically and axially positioned therein by means of circularly spaced shims, indicated in dotted line at 88. An annular blob of cementing material in soft form is then applied to the outer surface of each of the locating rings and the end shields are then slipped over the machined surfaces 35 of the shell 10. With the nuts 62 entered into the shell 10, the machine screws 60 are entered and tightened securely, attaching the end shields to the shell. The machine screws 56 are then entered and tightened. As the end shields are entered into position on the shell 10, the annular blobs of cementing material are distributed axially over the outer surfaces of the locating rings and the inner surfaces of the recesses in the end shields, there being sufficient material to fill the spaces between the loosely fitting locating rings and the clearance holes in the end shields with the screw threaded holes in the nuts 62 and in the bearing caps.

Suitable heating means is then employed to set and harden the cementing material, which is preferably a form of epoxy resin. After the cementing material is hardened, the shims 88 are removed. Circularly arranged access holes in the end shield and air circulating fan structure may be provided at one end of the motor for the extension and withdrawal of the shims 88. However, if for any reason such access holes are undesirable, one end shield and a portion of the fan structure at one end may be disassembled to permit removal of the shims 88 and thereafter reassembled without losing the established concentricity and alignment of the stator and bearings. Moveover, after the cementing material has hardened, the motor may be completely disassembled by removal of the end shields, the rotor, and the stator from the shell, when required to permit repair, and then reassembled without losing the established concentricity and alignment of the stator and bearings. The removable nuts 62 permit the removal of the stator mounting ring 18 when this member is press fitted and/or pinned to the shell.

The established concentricity of the rotor in the stator bore and alignment of the bearings will be retained by virtue of the slip fit relationship of the bearing caps in the locating rings, which locating rings were fixed in the end shields by the hardening of the cement when the shields were closely fitted on the machined surface 35 and attached to the shell. The angular positions of the stator in the shell and of the end shields on the shell are preferably marked before disassembly so that they may be replaced in the same angular position inasmuch as the concentricity and alignment of the locating rings with the stator bore was established with the stator and end shields in a particular angular position with respect to the shell.

The foregoing description is intended to be illustrative and not limiting, the scope of the invention being set forth in the appended claims.

We claim:

1. In a take apart ball bearing electric motor, a stator having a bore, a rotor including a shaft rotatably mounted in said stator bore, a ball bearing fixed on opposite end portions of said shaft, a stator shell fixed on said stator, a bearing supporting end shield attached to each end of said stator shell and at least one of which is detachably connected to said shell and includes a peripheral surface closely interfitting with a surface of said stator shell, said end shields each having a central internal recess, a bearing locating ring loosely received in each of said recesses and fixed therein concentric with said stator bore by an adhesive structural cement filling the spaces between the peripheries of said loosely fitting bearing locating rings and the axial walls of said recesses, and said ball bearings being entered into said bearing locating rings and having a slip fit therein whereby they are supported concentric with said stator bore.

2. In a ball bearing electric motor as set forth in claim 1 in which said ball bearings are equipped with circular bearing caps fitted over the outer bearing races and in which said circular bearing caps are entered into said bearing locating rings in slip fit relationship.

3. A bearing supporting end shield for use with a take apart, ball bearing, electric motor having a stator shell and having ball bearings press fitted on the rotor shaft, said end shield having a peripheral, annular, axially extending surface machined for close fit relationship with an annular, axially extending, machined surface at the end of a stator shell and having a central aperture therein to permit a rotor shaft to pass therethrough, said end shield being further provided with a central, circular, internal recess, a bearing locating ring entered into said recess, said bearing locating ring having an outside diameter substantially smaller than the diameter of said recess and being rigidly fixed in said recess concentric with said peripheral machined surface by a cementing material filling the annular space between the periphery of said locating ring and the wall of said recess, and said bearing locating ring having an internal diameter adapted to receive a ball bearing on the rotor shaft in slip fit relationship and position it concentric with said peripheral machined surface of said end shield.

4. A bearing supporting end shield as set forth in claim 3 in which said bearing locating ring includes an annular radially extending portion which lies against the bottom of said circular recess in said end shield.

5. In a take apart ball bearing electric motor, a stator having a bore and including a surrounding shell fixed thereon, a rotor including a shaft rotatably mounted in said stator bore, a ball bearing fixed on each end portion of said shaft, a bearing supporting end shield at each end of said stator shell having annular peripheral surfaces interfitting with surfaces on said stator shell, means detachably connecting said end shields to said stator shell, a bearing locating ring positioned on the inside of each of said end shields concentric with the said peripheral surfaces thereof and rigidly fixed thereto by cementing, and said bearings being entered into said bearing locating rings and supported thereby concentric with said annular peripheral surfaces of said end shields.

References Cited
UNITED STATES PATENTS

| | | | |
|---|---|---|---|
| 2,650,992 | 9/1953 | Forss et al. | 310—42 |
| 3,378,709 | 4/1968 | Royer et al. | 310—90 |
| 3,437,853 | 4/1969 | Arnold | 310—42 |

WARREN E. RAY, Primary Examiner

U.S. Cl. X.R.

310—90